United States Patent [19]

Griesmar

[11] Patent Number: 4,925,371
[45] Date of Patent: May 15, 1990

[54] FLOW RATE CONTROL FOR A VARIABLE STROKE PUMP

[75] Inventor: André R. Griesmar, Alizay, France

[73] Assignee: Dosapro Milton Roy, France

[21] Appl. No.: 284,630

[22] Filed: Dec. 14, 1988

[30] Foreign Application Priority Data

Dec. 17, 1987 [FR] France .............................. 87 17635

[51] Int. Cl.$^5$ ............................................. F04B 49/02
[52] U.S. Cl. ...................................... 417/18; 417/45; 417/63; 417/415
[58] Field of Search ....................... 417/18, 63, 415, 45

[56] References Cited

U.S. PATENT DOCUMENTS

| | | | |
|---|---|---|---|
| 3,985,019 | 10/1976 | Boehme et al. | 73/61.1 C |
| 4,326,837 | 4/1982 | Gilson et al. | 417/63 |
| 4,681,513 | 7/1987 | Saito et al. | 417/45 |
| 4,702,674 | 10/1987 | Fontaine et al. | 417/44 |

FOREIGN PATENT DOCUMENTS

| | | |
|---|---|---|
| 0025575 | 3/1981 | European Pat. Off. |
| 3301741 | 7/1984 | Fed. Rep. of Germany |
| 2331021 | 6/1977 | France |
| 2500081 | 8/1982 | France |
| 2588319 | 4/1987 | France |
| 1176870 | 1/1970 | United Kingdom |

*Primary Examiner*—Leonard E. Smith
*Assistant Examiner*—David W. Scheuermann
*Attorney, Agent, or Firm*—Griffin, Branigan & Butler

[57] ABSTRACT

A system for controlling the throughput of a metering pump, the pump including a pumping member (8) driven by a transmission member (4) for converting rotary motion of a reversible drive motor (1) into reciprocating motion of the pumping member, the system comprising means for adjusting the amplitude of the reciprocating motion and means for adjusting the period of said motion. The means for adjusting the amplitude of said reciprocating motion comprise: a sensor (23) for sensing the displacement of the transmission member (4) and for emitting a value which is a function of the value of the amplitude of the displacement; a comparator (21) for comparing said value with an adjustable reference value (20) and for emitting an output signal when the compared values are equal; and an electronic control circuit (24) receiving the signal emitted by the comparator (21) at an input, and responding to said signal firstly by switching over the power supply to the motor (1) in order to reverse its direction of rotation, and secondly by activating detection means (22) for detecting that the transmission member has returned to an origin position; said detection means (22) sending a signal to the electronic circuit when the origin position is reached, with the electronic circuit (24) responding thereto by switching off the power supply to the motor (1); and the means for adjusting the period of the motion are constituted by a pulse generator (28) for sending pulses to the electronic circuit (24) which responds thereto by powering the motor (1) so as to move the transmission member (4) away from said origin position.

9 Claims, 2 Drawing Sheets

FLOW RATE CONTROL FOR A VARIABLE STROKE PUMP

BACKGROUND OF THE INVENTION

French patent number 2 588 319 describes a method of accurately controlling the throughput of a metering pump by acting on three parameters of the electricity power supply to a reversible synchronous motor, namely: the winding to which the electricity is applied, thereby determining the direction in which the motor rotates; the time during which the electricity is supplied, thereby determining the length of the half-stroke of the pumping member; and the total time of a go-and-return cycle of said member, thereby determining the pump rate. In said method, a microprocessor is used which receives input data corresponding to the desired throughput expressed as a fraction of the maximum throughput of the pump or else expressed in the form of two items corresponding respectively to the desired stroke and to the desired rate, and it then selects appropriate motor control parameters on the basis of said received data with the selected values being taken from values contained in its memory, and it then controls the motor as a function of the parameters it has selected.

It has been observed that the method described requires the use of very high quality pumps, since the values stored in the memory of the microprocessor imply that there is very little dispersion in the operating parameters of different pumps, i.e. the pumps need to be manufactured with a great deal of care to ensure that desired precision is obtained to within better than 1%.

There also exist less sophisticated metering pumps in which throughput is controlled firstly by controlling the rate of the pump by means of electronic regulation, and secondly by controlling its stroke by acting mechanically on the components of its transmission by means of abutments for the displacement of the transmission components or by using servo motors to drive said components.

The present invention seeks to extend the advantages of throughput control that does not act on mechanical components by means of stroke-limiting members which are always difficult to adjust and liable to come out of adjustment, and which does not make use of servo motors, while nevertheless using means which are simplified in comparison to the means described in the above-mentioned French patent.

SUMMARY OF THE INVENTION

To this end, the invention provides a system for controlling the throughput of a metering pump, the pump including a pumping member driven by a transmission member for converting rotary motion of a reversible drive motor into reciprocating motion of the pumping member, the system comprising means for adjusting the amplitude of the reciprocating motion and means for adjusting the period of said motion, wherein said means for adjusting the amplitude of said reciprocating motion comprise:

a sensor for sensing the displacement of the transmission member and for emitting a plurality of pulses with the number of emitted pulses being converted into an analog value which is a function of the value of the amplitude of the displacement;

a comparator for comparing said analog value with an adjustable reference value and for emitting an output signal when the compared values are equal; and an electronic control circuit receiving the signal emitted by the comparator at an input, and responding to said signal firstly by switching over the power supply to the motor in order to reverse its direction of rotation, and secondly by activating detection means for detecting that the transmission member has returned to an origin position;

said detection means sending a signal to the electronic circuit when the origin position is reached, with the electronic circuit responding thereto by switching off the power supply to the motor;

and wherein the means for adjusting the period of the motion are constituted by a pulse generator for sending pulses to the electronic circuit which responds thereto by powering the motor so as to move the transmission member away from said origin position.

In an embodiment of the invention, the sensor for sensing displacement of the transmission member is constituted by an optical encoder constrained to rotate with a rotary component of the transmission member driven by the motor.

Further, the means for detecting the origin position are constituted by a counter for counting pulses of the A.C. power supply to the motor, said counter being reset to zero each time a pulse is emitted by the optical encoder, said encoder including an inactive range in the vicinity of the origin position during which no pulses are emitted, the counter sending a signal to the electronic circuit when its pulse count is equal to a reference value.

The logic circuit may be connected to an internal pulse emitter, thereby enabling the throughput of the pump to be controlled in absolute manner, or else it may be connected to an external pulse emitter, thereby enabling the throughput of the pump to be servo-controlled as a function of some other magnitude, e.g. the flow rate of fluid along main ducting into which the measured quantities are injected, in which case the external emitter constitutes a flowmeter. A connector allows one or other of the pulse emitters to be selected, with the external emitter being connectable to the apparatus by means of a pluggable connector.

BRIEF DESCRIPTION OF THE DRAWINGS

An embodiment of the invention is described by way of example with reference to the accompanying drawings, in which.

MORE DETAILED DESCRIPTION

Figure 1:
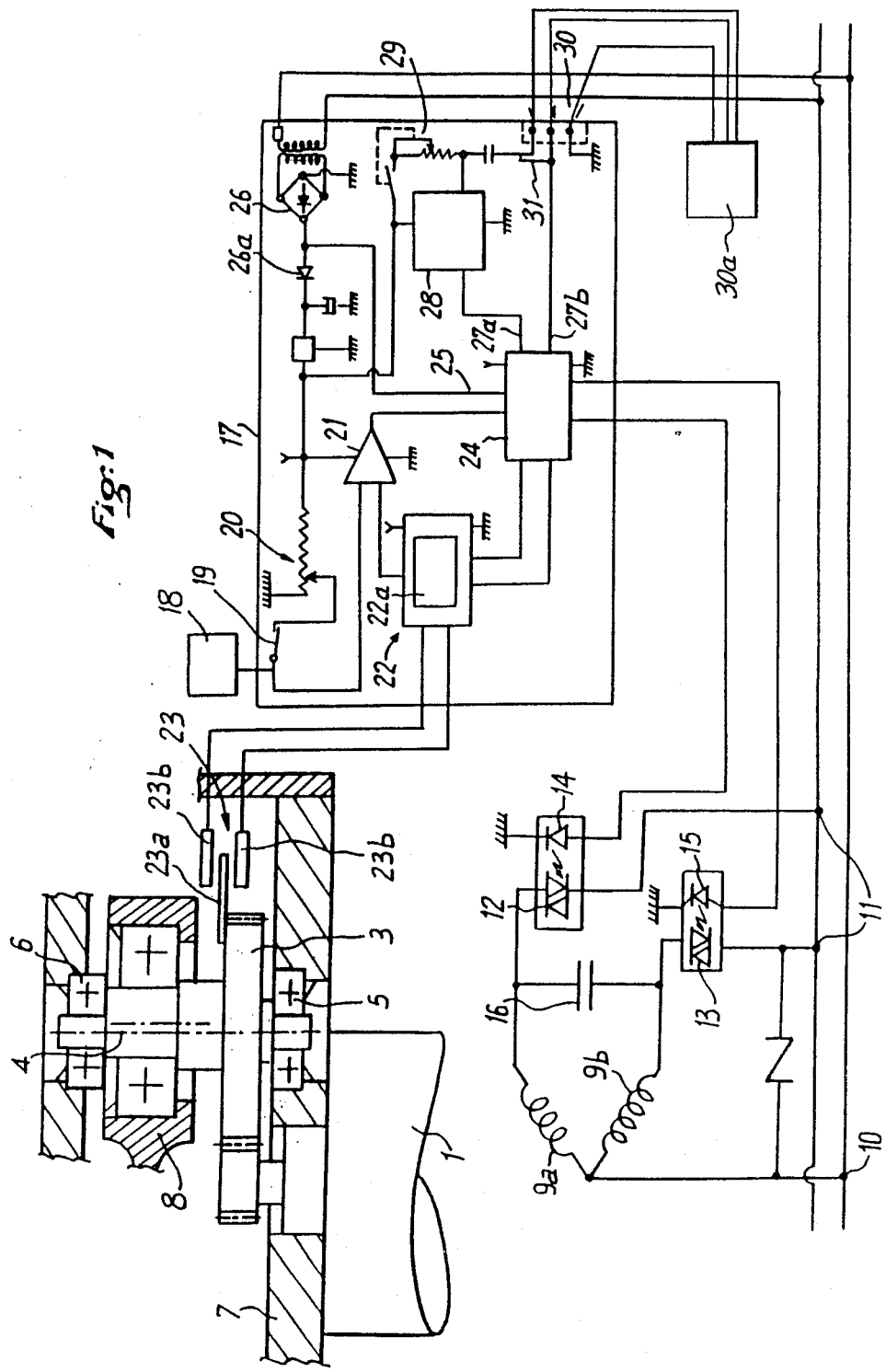
FIG. 1 is a diagram of one embodiment of the invention.

Reference is made initially to FIG. 1 which shows, in diagrammatic form, a synchronous reversible motor 1 driving a crank shaft 4 via a stepdown gear system 2, 3, with the crank shaft being rotatably held in bearings 5 and 6 of a frame 7. The crank pin of the crank shaft carries the big end 8 of a connecting rod for actuating a pump member (not shown) which may be a piston or a membrane.

Maximum pump throughput is obtained when the crank shaft is driven continuously at a given speed of rotation determined by the speed of rotation of the drive motor and the stepdown ratio of the gear unit 2, 3.

In order to deliver a fraction of said maximum throughput, the rotary drive motion applied to the crank shaft must be made discontinuous and reciprocating so as to be able to act both on the stroke of the connecting rod big end 8 and on the pumping rate.

To do this, when the motor 1 is a reversible synchronous motor having two windings 9a and 9b, a circuit is provided for controlling the supply of power to said windings as follows.

The common point between the windings is connected to an A.C. power supply terminal 10 at a known frequency (e.g. 50 Hz). Each of the windings is also connected to the other terminal 11 of this A.C. source via a respective triac 12 or 13 which is optocoupled to a light emitting diode (LED) 14 or 15 which constitutes its control member. A capacitor 16 is connected in conventional manner between the two windings 9a and 9b. When the triac 12 is made conductive, the windings are powered as follows: the winding 9a is powered by mains voltage; and the other winding 9b is powered by a voltage which is phase shifted by the capacitor, thereby causing the crank shaft to rotate in first direction of rotation. The direction of rotation is reversed by switching over the power supply so that the triac 12 is no longer conducting whereas the triac 13 is caused to conduct. The LEDs 14 and 15 are excited by a control unit 17 as a function of the way in which it is desired to control the power supply to the motor 1 in order to obtain the desired throughput from the pump.

The control unit 17 firstly comprises means for adjusting the stroke of the moving parts. These means comprise a member 20 for selecting a reference value corresponding to the desired stroke of the connecting rod. This desired stroke may be expressed as a fraction (%) of the total stroke using a manually controlled potentiometer delivering an analog value (voltage) which is proportional to the desired fraction.

This reference value is applied to a comparator 21 which also receives a variable voltage generated by a converter 22. The input to the converter receives pulses delivered by an optical encoder 23. The number of these pulses is related to the annular stroke of a disk 23a belonging to the coder and described in greater detail with reference to FIG. 2. The disk 23a is fixed to gear wheel 3 of the stepdown gear unit 2, 3 and is thus constrained to rotate together with the crank shaft 4.

An optical coder of a different type could be used in the device. In particular, the coder could be constituted by a sensor for sensing the displacement of the connecting rod or of the pumping member and suitable for generating an analog or a digital value suitable for comparison (after conversion where necessary) with the reference value.

When the comparator 21 receives equal value inputs, it generates an output signal applied to an electronic control circuit 24 which responds by switching off the LED 14 and, after a very short rest period, by switching on the LED 15. The power supply to the motor 1 is thus switched over and the motor rotates in the opposite direction.

Simultaneously, the electronic circuit 24 activates a counter 22a belonging to the converter 22 via a control logic circuit contained therein. The control logic circuit then receives input pulses 25 corresponding to the frequency of the A.C. mains (and more particularly to twice that frequency, given the diode bridge 26 and the diode 26a) and these mains pulses are applied to the counter 22a of the converter 22. The counter is reset to zero by each of the pulses emitted by the optical encoder 23 rotating in the opposite direction. The optical encoder has an angular extent defined relative to a position of the crank shaft (e.g. in the vicinity of its position corresponding to front dead center for the pumping member), during which it emits no further pulses. Since the counter 22a is no longer reset to zero, it continues to count the pulses it receives at its input until it reaches a number corresponding to a determined reference value. At this moment, the converter 22 delivers a signal to the electronic circuit 24 which responds by switching off the LED 15. The motor stops and the moving parts are in an origin position (e.g. front dead center).

It can thus be seen that the moving parts always stop at the end of the return stroke in a determined fixed position.

The circuit 24 causes a new pumping cycle to begin by switching on the LED 14 in response to a signal it receives on one or other of its two inputs 27a and 27b. The input 27a is connected to the output of a pulse generator 28 whose frequency can be manually adjusted, e.g. by means of a potentiometer 29 which is included in an RC type circuit. This generator may be of any conventional type and if digital, it may include independent clock means. The cycle time is adjusted by adjusting the frequency of the pulses.

Alternatively, the input 27b of circuit 24 may receive pulses which are generated by an external generator (e.g. a flowmeter). Under such conditions, the pump rate (and thus for given stroke the pump throughput) can be servo-controlled to an external parameter such as the flow rate of the fluid into which the measured quantity of fluid is pumped. This external generator 30a may be connected to the apparatus by a pluggable connection at 30, with said connection also serving to operate a switch 31 which isolates the circuit 24 from the internal pulse supply 28.

Figure 2:
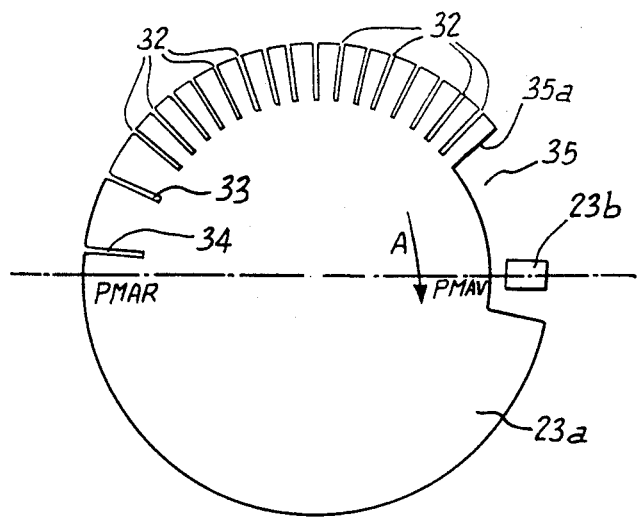
FIG. 2 is a detailed diagram of an optical encoder used in the invention.

FIG. 2 shows the disk 23a which forms a part of the optical encoder 23 and which co-operates with a sensor 23b which is conventional, per se. The disk comprises a plurality of slots 32, 33, 34, and a notch 35.

Roughly speaking, the sensor 23b emits a pulse each time a slot goes past it. Each of these pulses increments the counter 22a of the converter 22 during the suction stroke of the pump and conversely returns the counter to zero during the opposite, delivery stroke, as explained above. The direction of rotation of the disk 23a during the suction stroke is shown by arrow A in FIG. 2.

The gaps between the slots defined by the angle at the center between two successive slots is a function of the control sensitivity to be imparted to the pump, and it need to satisfy the sine function as followed by the little end of the connecting rod as a function of the angle of rotation of the crank shaft pin. In practice, since the excentricity of the crank shaft pin is at least ten times smaller than the length of the connecting rod, the angular spacing between the slots on the disk corresponds to a function of the arc-sine type for each desired fraction of the stroke.

Control sensitivity is limited due to the way in which triacs operate. Triacs switch off in the absence of excitation of their control LEDs, but not until the next zero pass of the mains supply. Thus, for mains at a frequency of 50 Hz, a triac will effectively switch off the power supply under its control not more than 10 milliseconds after its LED has been switched off.

These 10 milliseconds correspond to an angle of rotation of the crank shaft which, for a given synchronous motor operating at synchronous speed, increases with decreasing stepdown ratio of the gear unit 2, 3, i.e. the faster the crank shaft rotates the bigger the corresponding angle. For example, if it is desired that the throughput of a pump be adjustable in steps of 5%, and if the pump is driven by a synchronous motor whose synchronous speed is 375 revolutions per minute (rpm) with a stepdown ratio of 3.5, then 10 milliseconds correspond to the crank shaft rotating through 6.43°. Unfortunately, the above-mentioned arc-sine function for 5% stroke gives rise to an angle between two slots of about 5.6° once the crank shaft has turned through one fourth of a turn from one of the dead center positions of the moving parts.

For example, if it is observed with a reference throughput of 45% that the LED of the triac under consideration happens to switch off at the end of a mains half cycle, then the real stroke will indeed correspond to the reference stroke. However, at 50%, i.e. for an additional 5.7°, the triac would continue to operate for a stroke corresponding to a further 0.7°, and the real stroke would be slightly greater than 50%. In contrast, for a 40% reference, i.e. for 5.8° less, the triac would switch off only at the end of the following half period, i.e. the real stroke would correspond to 45% even though the reference stroke was 40%.

One solution for mitigating this drawback consists in ensuring that the angle of rotation corresponding to 10 milliseconds is small, i.e. in reducing the speed of the crank shaft by increasing the stepdown ratio of the gear unit relative to the smallest angle between two slots in the disk. This solution is appropriate for slow moving pumps of large cylinder capacity.

For faster moving pumps, another solution consists in placing the slots so that the angles between them correspond to the angle travelled by the crank shaft at the synchronous speed of the motor (or to a multiple thereof). Thus, in FIG. 2, the slots 32 are spaced apart at angles corresponding to the angle travelled by the crank shaft 4 when driven by the motor and stepdown gear unit of the above example for a period of 10 milliseconds. By giving the value 15% to the slot adjacent to the notch 35 and the value 90% to the slot adjacent to the slot 33, the absolute error between the measured value and the theoretical stroke is never greater than ±1.7%, or thereabouts. The slot 33 is at a distance from the adjacent slot 32 which corresponds to twice the above-specified angle (20 milliseconds), and the slot 34 is situated at three times this angle relative to the slot 33. Given that these slots are located close to rear dead center (RDC), the error relative to the theoretical stroke is extremely small. It may be observed that slot 34 which corresponds to 100% of the stroke is 10 milliseconds (in time) away from rear dead center, which corresponds to the response time required for triac switching.

The notch 35 of the disk 23a is such that while it is passing the sensor 23b no pulses are transmitted to the counter 22a. As mentioned above, the counter can therefore count pulses corresponding to mains frequency during the return stroke of the moving parts.

The device of the invention operates as follows. It is assumed initially that the pump is operating independently as a function of the reference values indicated by means of the members 20 and 29.

The first pulse emitted by the pulse generator 28 reaches the logic circuit 24 and causes the LED 14 to be switched on. The motor is powered to rotate in one direction. It locks rapidly onto its synchronous speed (generally within the first mains half period). The disk 23a rotates in the direction A and the encoder 23 emits pulses to the counter 22a and the converter 22 until the comparator 21 observes equality and generates an output signal which causes the circuit 24 firstly to switch off the LED 14 and secondly to switch on the LED 15 after a time delay of about 10 milliseconds. When the triac 13 is switched on, the motor rotates in the opposite direction. Simultaneously, by virtue of an incorporated control logic circuit, the circuit 24 puts the counter and converter assembly 22, 22a into a state in which the counter counts the pulses received at input 25, which pulses correspond to rectified mains frequency, with the counter being reset to zero at each pulse emitted by the coder 23. The disk 23a rotates in the direction opposite to the direction A. The edge 35a of the notch 35 is sensed like a slot and resets the counter 22a to zero. Thereafter, the counter counts mains half periods until it reaches a number equal to a determined number given thereto as a reference during manufacture (e.g. 6). At this moment, the converter emits a signal to cause the circuit 24 to switch off LED 15. The motor stops at the end of the following half period and the disk is in the position shown in FIG. 2 which corresponds, if the equipment is so constructed, to the moving parts being in front dead center. It will be understood that this position is reached respectively at the end of each return stroke of the moving equipment. I.e. it constitutes an extremely reliable origin position.

A new cycle is started when the circuit 24 receives the next pulse from the pulse generator 28. It can thus be seen that for a given rate, it is possible to modify the throughput by acting on the stroke and that for given stroke it is possible to modify the throughput by acting on the rate, given that in either case the cycle time cannot be less than the time required for a go-and-return cycle of the moving parts.

In order to servo-control the pump as a function of a pulse flowmeter, for example, all that needs to be done is to connect said pulse emitting flowmeter to the control unit 17 via the connector 30. In this case there remains only one way of acting on the throughput: only the stroke can still be adjusted. The delivered throughput will thus be proportional to the main flow rate with the coefficient of proportionality being adjustable. In some cases, it is not possible to servo-control the throughput of the pump by acting solely on its rate. It must be possible to act on the value of its stroke, for example because the viscosity of the pumped fluid does not make it possible to operate at rates below a given threshold. In FIG. 1, reference 18 represents the comparator 21 being supplied with a reference signal (current or voltage) which, as an alternative to that generated by the potentiometer 20, serves to servo-control the length of the stroke to said variable reference value. The electronic member 18 serves to filter, shape, and convert to a scale compatible with that of the comparator 21, in particular by adjusting the zero and the gain of the said member, a current or a voltage generated by a sensor (pH, flow rate, viscosity, ...) or from a regulator, depending on whether open loop or closed loop servo-control is to be provided. When such stroke length servo-control is put into operation, the potentiometer 20 is taken out of circuit by opening a switch 19, e.g. mechanically on plugging in a plug-in connector.

One of the advantages of the pump in accordance with the invention lies in the fact that the control unit 17 and the opto-coupled triacs for controlling the power supply to the motor can be housed together in a single housing. The pump need then only be provided with pluggable connections for connection to the motor windings and to the coder 23. Two connecting cables then suffice firstly for connecting the coder housing and secondly for powering the motor from the control housing by means of the triac. In a version of this type, it is possible to place the control housing at a distance from the pump and even to omit using the housing. In which case the pump is directly powered from mains connected to the motor windings and operates as an ordinary pump having a fixed throughput (its maximum throughput) with the crank shaft turning continuously.

Finally, in the most sophisticated variant of the invention, the pump provided with the optical encoding disk may be connected to a programmable automoton or a computer or a microprocessor having an electronic interface including the opto-coupled triacs or static relays, in which case the electronic circuit 24 and the controlling circuits are replaced by a program including instructions for providing control as a function of received signals and of reference values.

The invention is advantageously applicable to metering pumps.

I claim:

1. A system for controlling the throughput of a metering pump, the pump including a pumping member driven by a transmission member for converting rotary motion of a reversible drive motor into reciprocating motion of the pumping member, the system comprising means for adjusting the amplitude of the reciprocating motion and means for adjusting the period of said motion, wherein the means for adjusting the amplitude of said reciprocating motion comprise:

an optical encoder constrained to rotate with a rotary component of the transmission member driven by the motor for emitting a plurality of pulses with the number of emitted pulses being converted into an analog value which is a function of the value of the amplitude of the displacement;

a comparator for comparing said analog value with an adjustable reference value and for emitting an output signal when the compared values are equal; and an electronic control circuit for receiving the signal emitted by the comparator at an input, and responding to said signal firstly by switching over the power supply to the motor in order to reverse its direction of rotation, and secondly by activating a counter for counting pulses of the A.C. power supply to the motor, said counter being reset to zero each time a pulse is emitted by the optical encoder, said encoder including an inactive range in the vicinity of the origin position during which no pulses are emitted, the counter sending a signal to the electronic circuit when its pulse count is equal to a reference value, with the electronic circuit responding thereto by switching off the power supply to the motor;

and wherein the means for adjusting the period of the motion are constituted by a pulse generator for sending pulses to the electronic circuit which responds thereto by powering the motor so as to move the transmission member away from said origin position.

2. A system according to claim 1, wherein the optical encoder comprises a disk provided both with peripheral slots which are separated from one another by an angle at the center equal to the angle of rotation through which the transmission member travels once the motor has reached synchronous speed for a period of time equal to one half period of the A.C. power supply of the motor, or to a multiple of said angle, and provided also with a notch whose peripheral extent covers an angle at the center which is not less than the angle travelled by the disk during a predetermined number of half-periods of said A.C. power supply.

3. A system according to claim 1, wherein the pulse generator of the means for adjusting the period of the reciprocating motion is internal and includes means for adjusting the frequency of the pulses it generates.

4. A system according to claim 1, wherein the pulse generator for adjusting the period of the reciprocating motion is an external generator.

5. A system according to claim 3, wherein the pulse generator of the means for adjusting the period of the reciprocating motion is an external generator, and wherein the system includes a switch for selectively connecting the electronic circuit to the internal pulse generator or to an input for connection to the external pulse generator.

6. A system according to claim 1, the adjustable reference value for the displacement of the transmission member, is provided internally.

7. A system according to claim 1, wherein said drive motor is a synchronous motor in which the sequencing of the power supply to its winding is provided by static switching members coupled to outputs from the control circuit.

8. A system according to claim 1, wherein, apart from the encoder, the system is disposed in a housing which is separable from the pump and which is removably connected to said pump.

9. A system according to claim 1, wherein the adjustable reference value for the displacement of the transmission member is provided externally.

* * * * *